US011845825B2

(12) United States Patent
Saito

(10) Patent No.: US 11,845,825 B2
(45) Date of Patent: Dec. 19, 2023

(54) METHOD FOR MANUFACTURING RUBBER-REINFORCED STYRENIC RESIN POWDER AND RUBBER-REINFORCED STYRENIC RESIN POWDER

(71) Applicant: NIPPON A&L INC., Osaka (JP)

(72) Inventor: Takashi Saito, Niihama (JP)

(73) Assignee: NIPPON A&L INC., Osaka (JP)

(*) Notice: Subject to any disclaimer, the term of this patent is extended or adjusted under 35 U.S.C. 154(b) by 302 days.

(21) Appl. No.: 16/607,696

(22) PCT Filed: Mar. 26, 2019

(86) PCT No.: PCT/JP2019/012974
§ 371 (c)(1),
(2) Date: Oct. 23, 2019

(87) PCT Pub. No.: WO2019/189243
PCT Pub. Date: Oct. 3, 2019

(65) Prior Publication Data
US 2020/0131295 A1 Apr. 30, 2020

(30) Foreign Application Priority Data

Mar. 26, 2018 (JP) .................... 2018-057514
Mar. 26, 2018 (JP) .................... 2018-057515

(51) Int. Cl.
*C08F 12/08* (2006.01)
*C08F 2/22* (2006.01)
*C08F 255/02* (2006.01)
*C08F 265/06* (2006.01)
*C08F 279/02* (2006.01)
*C08F 6/22* (2006.01)
*C08J 3/12* (2006.01)
*C08K 5/20* (2006.01)

(52) U.S. Cl.
CPC ............ *C08F 279/02* (2013.01); *C08F 2/22* (2013.01); *C08F 6/22* (2013.01); *C08F 12/08* (2013.01); *C08F 255/02* (2013.01); *C08F 265/06* (2013.01); *C08J 3/124* (2013.01); *C08K 5/20* (2013.01)

(58) Field of Classification Search
CPC .. C08F 279/02; C08F 2/22; C08F 6/22; C08F 12/08; C08F 255/02; C08F 265/06; C08J 3/16; C08J 9/28; C08J 3/14; C08J 3/124; C08K 5/20
See application file for complete search history.

(56) References Cited

U.S. PATENT DOCUMENTS 3,896,093 A * 7/1975 Valoti ................. C08F 6/22
528/487
5,514,772 A * 5/1996 Suzuki ................. C08J 3/16
528/487

FOREIGN PATENT DOCUMENTS

| CN | 1383443 A | 12/2002 |
| CN | 105940051 | 9/2016 |
| JP | H 09316279 A | 12/1997 |
| JP | H 10279640 A | 10/1998 |
| JP | 2006/002159 A | 1/2006 |
| JP | 2013/505323 A | 2/2013 |
| JP | 6526279 B | 6/2019 |
| WO | WO 2011/034581 A2 | 3/2011 |

OTHER PUBLICATIONS

JP 09316279 machine translation (Year: 2021).*
JPH09316279 machine translation (Year: 2022).*
International Preliminary Report on Patentability dated Oct. 8, 2020 for PCT Application No. PCT/JP2019/012974, 8 pages, with English translation.
International Search Report dated Jun. 18, 2019 for PCT Application No. PCT/JP2019/012974, 2 pages.
Notice of Allowance dated Oct. 1, 2019 for Japanese Patent Application No. 2019-092639, 3 pages.

* cited by examiner

Primary Examiner — Irina S Zemel
Assistant Examiner — Jeffrey S Lenihan
(74) Attorney, Agent, or Firm — Squire Patton Boggs (US) LLP

(57) ABSTRACT

A method for manufacturing a rubber-reinforced styrenic resin powder comprising 40% by mass or more of a rubbery polymer, satisfying the following conditions (1) to (4):
  (1) at least first and second coagulation baths are provided;
  (2) the first and second coagulation baths are connected;
  (3) an emulsified dispersion of fatty acid amide is supplied to the connecting part in an amount of 0.2 parts by mass to 2.0 parts by mass (solid content) with respect to 100 parts by mass (solid content) of a slurry; and
  (4) a temperature in the second coagulation bath is equal to or higher than a temperature in the first coagulation bath.

4 Claims, 2 Drawing Sheets

METHOD FOR MANUFACTURING RUBBER-REINFORCED STYRENIC RESIN POWDER AND RUBBER-REINFORCED STYRENIC RESIN POWDER

TECHNICAL FIELD

The present invention relates to a method for manufacturing a rubber-reinforced styrenic resin powder and the rubber-reinforced styrenic resin powder.

BACKGROUND ART

As an improvement in the storage stability (ease of sticking) of a rubbery polymer-containing resin powder, for example, Patent Literature 1 discloses a method of adding an anticaking agent through a specific step.

CITATION LIST

Patent Literature

Patent Literature 1: Japanese Unexamined Patent Publication No. H10-279640

SUMMARY OF INVENTION

Technical Problem

However, the method described in Patent Literature 1 is still insufficient from the viewpoint of continuous productivity. The present invention makes it a first object to provide a manufacturing method for a rubber-reinforced styrenic resin powder which is excellent in continuous productivity and antisticking property.

Moreover, Patent Literature 1 describes that a powder having few fines and excellent storage stability is obtained by adding an anticaking agent through a specific step. Patent Literature 1 relates to an improvement in storage stability for a powder with few fines, but a powder with many fines typically tends to have closest packing and less storage stability. Therefore, the improvement in antisticking property of a powder containing many fines is still insufficient. The present invention makes it a second object to provide a rubber-reinforced styrenic resin powder which has an excellent antisticking property even for the powder with many fines.

Solution to Problem

As a result of intensive investigations, the present inventors have solved the above first object by providing at least first and second coagulation baths and defining the timing of adding an emulsified dispersion of fatty acid amide and a temperature of coagulation bath, and have found the present invention.

That is, the present invention provides the following [1].

[1] A method for manufacturing a rubber-reinforced styrenic resin powder comprising 40% by mass or more of a rubbery polymer, satisfying the following conditions (1) to (4):
(1) at least first and second coagulation baths are provided;
(2) the first and second coagulation baths are connected;
(3) an emulsified dispersion of fatty acid amide is supplied to the connecting part in an amount of 0.2 parts by mass to 2.0 parts by mass with respect to 100 parts by mass of slurry solid content; and
(4) a temperature in the second coagulation bath is equal to or higher than a temperature in the first coagulation bath.

As a result of intensive investigations, the present inventors have solved the above second object by the presence of the fatty acid amide on the surface of the powder in a specific coverage even for a rubber-reinforced styrenic resin powder with many fines, and have found the present invention.

That is, the present invention provides the following [2].

[2] A rubber-reinforced styrenic resin powder comprising 40% by mass or more of a rubbery polymer, and having more than 4.0% by mass of the powder passing through a 200-mesh plain weave wire mesh (according to JIS G3555-2004) made of stainless steel wire with a wire diameter of 0.10 mm, wherein a fatty acid amide is present on 50% or more of the powder surface.

Advantageous Effects of Invention

According to the method for manufacturing a rubber-reinforced styrenic resin powder of the present invention, the rubber-reinforced styrenic resin powder including 40% by mass or more of a rubbery polymer has excellent continuous productivity and further sticking of the powder is suppressed, thus providing a powder excellent in storage stability and handling property.

In addition, according to the rubber-reinforced styrenic resin powder of the present invention, the powder which has excellent storage stability and handling of the powder is obtained, due to suppression of sticking of the powder even when the rubber-reinforced styrenic resin powder is one which has a content of 40% by mass or more of a rubbery polymer and more than 4.0% by mass of the powder passing through a 200-mesh plain weave wire mesh (according to JIS G 3555-2004) made of stainless steel wire with a wire diameter of 0.10 mm.

DESCRIPTION OF EMBODIMENTS

Figure 1:
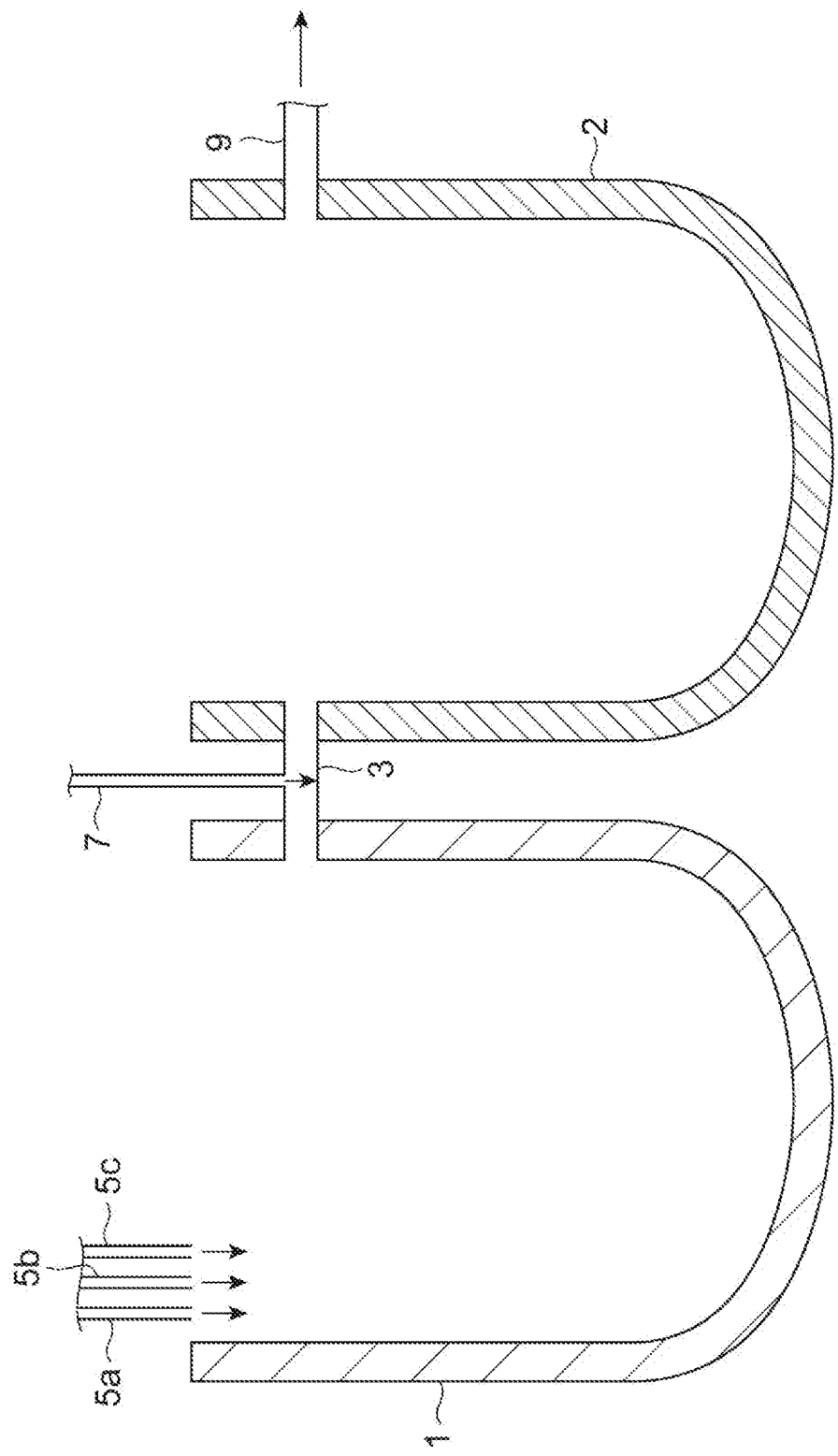
FIG. 1 is a schematic cross-sectional view showing one embodiment of the apparatus applicable to the manufacturing method of the present embodiment.

Hereinafter, preferred embodiments of the present invention will be described.

First Embodiment: Method of Manufacturing Rubber-Reinforced Styrenic Resin Powder The first embodiment is a method for manufacturing a rubber-reinforced styrenic resin powder comprising 40% by mass of a rubbery polymer, the method satisfying the above conditions (1) to (4).

The rubber-reinforced styrenic resin powder obtained by the manufacturing method of the present embodiment is obtained by coagulating the latex of the graft copolymer (A) obtained by an emulsion polymerization method with a styrenic monomer as an essential component, or a latex mixture of the latex of the graft copolymer (A) and the copolymer (B) obtained by an emulsion polymerization method with a styrenic monomer as an essential component (hereinafter, the latex of the graft copolymer (A) or a latex mixture of the latex of the graft copolymer (A) and the copolymer (B) obtained by an emulsion polymerization method with a styrenic monomer as an essential component is also collectively referred to as "latex raw material").

Examples of the rubbery polymer constituting the graft copolymer (A) used for the manufacturing method of the present embodiment include butadiene-based rubbery polymers such as polybutadiene, styrene-butadiene copolymer, and acrylonitrile-butadiene copolymer; ethylene-propylene-based rubbery polymers such as ethylene-propylene copolymer and ethylene-propylene-diene copolymer; (meth) acrylic rubbery polymers mainly composed of a (meth) acrylic acid ester monomer such as butyl acrylate or 2-ethylhexyl acrylate; silicone rubbery polymers; composite rubbery polymers of butadiene-based rubbery polymer/(meth) acrylic rubbery polymer; composite rubbery polymers of silicone rubbery polymer/(meth) acrylic rubbery polymer; and chlorinated polyethylene rubber. These can be used singly or in combination of two or more.

Examples of the monomer capable of graft polymerization on the rubbery polymer of the graft copolymer (A) used for the manufacturing method of the present embodiment include aromatic vinyl monomers such as styrene and α-methylstyrene as essential ones; vinyl cyanide monomers such as acrylonitrile; (meth) acrylic acid ester monomers such as methyl methacrylate; maleimide monomers; amide monomers; and unsaturated carboxylic acid monomers. These can be used singly or in combination of two or more.

Examples of the monomer of copolymer (B) used for the manufacturing method of the present embodiment include aromatic vinyl monomers such as styrene and α-methylstyrene as essential ones; vinyl cyanide monomers such as acrylonitrile; (meth) acrylic acid ester monomers such as methyl methacrylate; maleimide monomers; amide monomers; and unsaturated carboxylic acid monomers. These can be used singly or in combination of two or more.

The graft copolymer (A) and the copolymer (B) used for the manufacturing method of the present embodiment can be obtained by a known emulsion polymerization method.

Examples of the emulsifier used for an emulsion polymerization method include aliphatic carboxylates such as potassium oleate, dipotassium alkenyl succinate, and sodium rosinate; alkyl benzene sulfonates such as sodium dodecyl benzene sulfonate; aliphatic sulfonates such as sodium lauryl sulfate; alkyl diphenyl ether disulfonates; sulfuric acid ester salts of higher alcohols; formalin condensate of naphthalene sulfonic acid; anionic surfactants such as sulfuric acid ester salts of nonionic surfactants; and nonionic surfactants such as alkyl ester type, alkyl phenyl ether type, alkyl ether type of polyethylene glycol. These can be used singly or in combination of two or more.

Examples of the initiator used for an emulsion polymerization method include reducing agents such as persulfates such as potassium persulfate, sodium persulfate, and ammonium persulfate, and as redox type initiators, sodium sulfite, sodium thiosulfate, sodium formaldehyde sulfoxylate, ascorbic acid, and ferrous sulfate; and oxidizing agents such as potassium peroxodisulfate, hydrogen peroxide, benzoyl peroxide, cumene hydroperoxide, tert-butyl hydroperoxide, acetyl peroxide, diisopropylbenzene hydroperoxide, and 1,1,3,3-tetramethylbutyl hydroperoxide.

The content of the rubbery polymer in the rubber-reinforced styrenic resin powder obtained by the manufacturing method of the present embodiment is 40% by mass or more and is more preferable to be 50% by mass or more. The content of 40% by mass or more of the rubbery polymer can improve design freedom of components of the final composition containing the rubber-reinforced styrenic resin so as to contribute to product specialization. The upper limit of the content of the rubbery polymer is not particularly limited, and for example, it can be 90% by mass or less.

The content of the rubbery polymer in the rubber-reinforced styrenic resin powder can be adjusted by the content of the rubbery polymer constituting the graft copolymer (A) or mixing the graft copolymer (A) with the copolymer (B) in a latex state.

The rubber-reinforced styrenic resin powder obtained by the manufacturing method of the present embodiment can be obtained by coagulating the latex of the graft copolymer (A), or mixing the latex of the graft copolymer (A) with the latex of the copolymer (B) and coagulating them.

Examples of the coagulating agent used for coagulation include inorganic acids such as hydrochloric acid, phosphoric acid, sulfuric acid, and nitric acid; organic acids such as formic acid and acetic acid; and inorganic acid metal salts such as magnesium sulfate, calcium chloride, and aluminum sulfate. These can be used singly or in combination of two or more.

The coagulation step of the manufacturing method of the present embodiment is supplying 0.2 parts by mass to 2.0 parts by mass (solid content) of the emulsified dispersion of fatty acid amide with respect to 100 parts by mass (solids content) of the slurry to the connecting part, in which at least first and second coagulation baths are provided and these first and second coagulation baths are connected by a pipe or the like. Furthermore, it is characterized by that the temperature in the second coagulation bath is equal to or higher than the temperature in the first coagulation bath (the temperature in the second coagulation bath is equal to or higher than the temperature in the first coagulation bath).

The coagulating agent is supplied to the first coagulation bath or the first and the second coagulation baths. The amount supplied is preferable to be 2.0 parts by mass to 8.0 parts by mass (solid content) with respect to 100 parts by mass (solid content) of the slurry and more preferable to be 3.5 parts by mass to 6.5 parts by mass (solid content).

The basis of the amount of the emulsified dispersion of fatty acid amide and the coagulating agent supplied may be 100 parts by mass in terms of the solid content of the latex raw material, instead of the above "100 parts by mass (solid content) of the slurry".

Examples of the fatty acid amide in the emulsified dispersion of fatty acid amide used for the manufacturing method of the present embodiment include oleic acid amide, palmitic acid amide, stearic acid amide, and ethylene bis stearic acid amide. The method of emulsification and dispersion is not particularly limited, and examples thereof include mechanical dispersion such as a bead mill and a melt dispersion method such as a phase inversion method. The type of the emulsifier used for emulsification and dispersion is also not particularly limited, and known emulsifiers can be used. The emulsified dispersion of fatty acid amide is preferable to have an average particle size of 1.0 μm or less which is confirmed by the dynamic light scattering method.

The emulsified dispersion of fatty acid amide is added to the portion connecting the first and the second coagulation baths. Thereby, the slurry and the emulsified dispersion of fatty acid amide are efficiently contacted, allowing the fatty acid amide to be efficiently present on the surface of the powder. Therefore, sticking of the obtained powder can be suppressed.

The amount of the emulsified dispersion of a fatty acid amide supplied is 0.2 parts by mass to 2.0 parts by mass (solid content) with respect to 100 parts by mass (solid content) of the slurry, and is preferable to be 0.3 parts by mass to 1.5 parts by mass and is more preferable to be 0.4 parts by mass to 1.0 parts by mass (solid content).

The temperature in the first coagulation bath is preferable to be 70 to 95° C., and more preferable to be 80 to 90° C. The temperature in the second coagulation bath is equal to or higher than the temperature in the first coagulation bath and is preferable to be 3 to 28° C. higher. Thereby, a powder with good dewaterability and high bulk density is obtained. The temperature in the second coagulation bath is preferable to be 85 to 98° C. and is more preferable to be 90 to 98° C. The slurry concentration is preferable to be 20 to 30% from the viewpoint of productivity and is more preferable to be 22 to 28%.

The slurry is supplied to the second coagulation bath, and then may be supplied to the third coagulation bath connected thereto. The slurry completely coagulated is removed continuously from the coagulation bath, washed with water, dehydrated, and dried, allowing to obtain a rubber-reinforced styrenic resin powder.

For the rubber-reinforced styrenic resin powder obtained by coagulation, it is preferable that the fatty acid amide is present on 50% or more of the surface of the powder. The presence of the fatty acid amide in the above range can further suppress the sticking of the powder.

The coverage of the fatty acid amide on the surface of the powder can be measured using a time-of-flight secondary ion mass spectrometry (TOF-SIMS method).

FIG. 1 is a schematic cross-sectional view showing an embodiment of an apparatus applicable to the manufacturing method of the present embodiment. The apparatus in FIG. 1 comprises the first coagulation bath 1, the second coagulation bath 2, and a connecting pipe 3 connecting the first coagulation bath 1 and the second coagulation bath 2 at an upper portion. Raw materials such as the latex material, a coagulating agent, and water are supplied to the first coagulation bath 1 from raw material supply ports 5a, 5b, and 5c, respectively, and the emulsified dispersion of fatty acid amide is supplied to the connecting pipe 3 from a raw material supply port 7. The slurry after being coagulated is discharged from a discharge port 9 provided in the upper part of the second coagulation bath 2.

In the first coagulation bath 1, raw materials such as the latex material, a coagulating agent, and water are supplied from the raw material supply ports 5a, 5b, and 5c to form a slurry. Then, the slurry is transferred to the second coagulation bath 2 through the connecting pipe 3 of the first coagulation bath 1, and at this time, the emulsified dispersion of fatty acid amide is supplied from the raw material supply port 7. Furthermore, the slurry transferred to the second coagulation bath 2 is discharged from the discharge port 9. The slurry discharged from the discharge port 9 is washed with water, dehydrated, and dried, allowing to obtain a rubber-reinforced styrenic resin powder.

Figure 2:
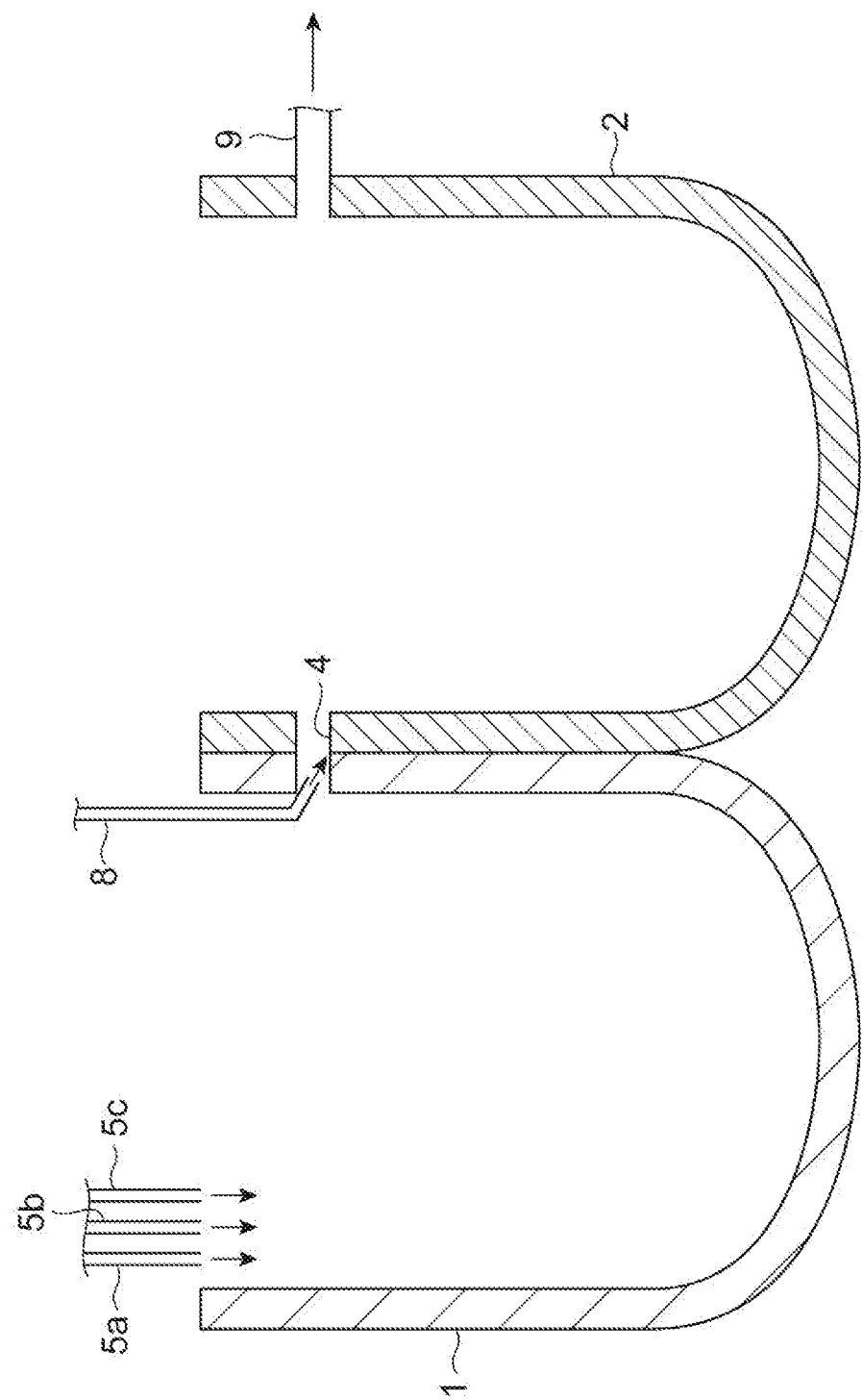
FIG. 2 is a schematic cross-sectional view showing another embodiment of the apparatus applicable to the manufacturing method of the present embodiment.

FIG. 2 is a schematic cross-sectional view showing another embodiment of the apparatus applicable to the manufacturing method of the present embodiment. In the apparatus in FIG. 2, the first coagulation bath 1 and the second coagulation bath 2 are in contact with each other, and the connecting part 4 penetrating these is provided at the upper part. The emulsified dispersion of fatty acid amide is supplied from the raw material supply port 8 directly to the connecting part 4. Others have the same configuration as the apparatus in FIG. 1.

Hereinafter, the first embodiment of the present invention will be described using Examples in detail, the first embodiment is not limited at all by these.

<Powder Sticking Evaluation>

The obtained rubber-reinforced styrenic resin powder was shaken with a plain weave test sieve (manufactured by Iida Seisakusho Co., Ltd.) with an aperture of 850 µm and a wire diameter of 523 µm to remove coarse particles. 25 g of the powder passing through the sieve was weighed and placed in a stainless mold of 50 mm in diameter and 50 mm in height, and a weight was placed from the top of the mold, and heat treatment was performed under a load of 3 kPa at 80° C. for 2 hours to obtain a powder lump. The powder lump obtained was set on a plain weave test sieve (manufactured by Iida Seisakusho Co., Ltd.) with an aperture of 2.8 mm and a wire diameter of 1.11 mm and was shaken for 30 seconds with a vibrator (low tap sieve shaker, manufactured by Hirako Seisakusho Co., Ltd.), and the residual percentage on sieve was measured from the weights of the powder lump before and after vibration. The lower value shows that sticking is more suppressed.

Residual percentage=weight of powder lump after vibration (g)/weight of powder lump before vibration (g)×100

<Method for Manufacturing Rubbery Polymer>

130 parts by mass of pure water, 100 parts by mass of butadiene, 0.4 parts by mass of normal dodecyl mercaptan, and 3 parts by mass of a 10% potassium oleate solution were supplied to a pressure-resistant reactor equipped with stirring blades, and the temperature was increased with stirring and 0.25 parts by mass of potassium persulfate was added at 65° C. Then, the temperature was increased to 70° C. and 22 parts by mass of a 10% potassium oleate solution was added stepwise, and the reaction was completed in 55 hours. The average particle size of the obtained butadiene rubber latex (measured using FPAR-1000, manufactured by Otsuka Electronics Co., Ltd.) was 0.41 µm, and the solid content was 39.1%.

<Method for Manufacturing Graft Copolymer>

153.45 parts by mass of the above butadiene rubber latex (60 parts by mass as a solid content) and 50 parts by mass of pure water were supplied to a reactor equipped with stirring blades, the temperature was increased with stirring, 0.3 parts by mass of potassium persulfate was added at 60° C., when the temperature reached 65° C., a mixed monomer consisting of 30 parts by mass of styrene and 10 parts by mass of acrylonitrile and 20 parts by mass of a 10% potassium oleate solution was continuously added over 6 hours, and aging was carried out at 70° C. for 2 hours after the addition was completed. The solid content of the obtained graft copolymer latex was 37.3%.

<Emulsified Dispersion of Fatty Acid Amide>

The emulsified dispersion of ethylene bis-stearic acid amide was used at a solid content of 25% and an average particle size of 0.5 (measured using FPAR-1000, manufactured by Otsuka Electronics Co., Ltd.).

(Example 1A)

Two coagulation baths having 15 L capacity equipped with stirring blades were connected with a pipe at the upper portion, and the temperature of the first bath and the second bath were temperature controlled at 77° C. and at 93° C., respectively. 100 parts by mass of the graft copolymer latex in terms of solid content, pure water, and 4.0 parts by mass of magnesium sulfate were continuously added to the first bath at a rate of 5 kg/h as a treatment in terms of solid content, so that the slurry concentration was 20%, and the emulsified dispersion of fatty acid amide was continuously added to the connecting pipe at 0.2 parts by mass with respect to 100 parts by mass of the graft copolymer latex in terms of solid content.

Then, the slurry that overflowed from the upper discharge port of the second bath was washed with water and dehydrated, and was further dried in a hot air dryer at 85° C. for 15 hours to obtain a rubber-reinforced styrenic resin powder. The result of sticking evaluation of the obtained rubber-reinforced styrenic resin powder was 75%.

(Example 2A)

The treatment was performed under the same conditions as in Example 1A, except that the emulsified dispersion of fatty acid amide was added at 0.5 parts by mass in terms of solid content. The result of sticking evaluation of the obtained rubber-reinforced styrenic resin powder was 42%.

(Example 3A)

The treatment was performed under the same conditions as in Example 1A, except that the emulsified dispersion of fatty acid amide was added at 1.5 parts by mass in terms of solid content. The result of sticking evaluation of the obtained rubber-reinforced styrenic resin powder was 35%.

(Comparative Example 1A)

The treatment was performed under the same conditions as in Example 1A, except that the emulsified dispersion of fatty acid amide was not added. The result of sticking evaluation of the obtained rubber-reinforced styrenic resin powder was 92%.

(Comparative Example 2A)

The treatment was performed under the same conditions as in Example 1A, except that the emulsified dispersion of fatty acid amide was added at 0.05 parts by mass in terms of solid content. The result of sticking evaluation of the obtained rubber-reinforced styrenic resin powder was 89%.

(Comparative Example 3A)

The treatment was performed under the same conditions as in Example 1A, except that the emulsified dispersion of fatty acid amide was previously added to the graft copolymer latex at 0.5 parts by mass in terms of solid content and was not supplied to the connecting pipe between the first bath and the second bath. The result of sticking evaluation of the obtained rubber-reinforced styrenic resin powder was 92%.

(Comparative Example 4A)

The treatment was performed under the same conditions as in Example 1A, except that the emulsified dispersion of fatty acid amide was previously added to the graft copolymer latex at 2.0 parts by mass in terms of solid content and was not supplied to the connecting pipe between the first bath and the second bath. The result of sticking evaluation of the obtained rubber-reinforced styrenic resin powder was 90%.

TABLE 1

|  | Example 1A | Example 2A | Example 3A | Comparative Example 1A | Comparative Example 2A | Comparative Example 3A | Comparative Example 4A |
| --- | --- | --- | --- | --- | --- | --- | --- |
| Number of parts by mass supplied of emulsified dispersion of fatty acid amide (solid content) | 0.2 | 0.5 | 1.5 | — | 0.05 | 0.5 | 2.0 |
| Timing of supplying emulsified dispersion of fatty acid amide | Connecting pipe | Connecting pipe | Connecting pipe | — | Connecting pipe | Previous addition to latex | Previous addition to latex |
| Preset temperature of the first coagulation bath (° C.) | 77 | 77 | 77 | 77 | 77 | 77 | 77 |
| Preset temperature of the second coagulation bath (° C.) | 93 | 93 | 93 | 93 | 93 | 93 | 93 |
| Evaluation of sticking (%) | 75 | 42 | 35 | 92 | 89 | 92 | 90 |

As shown in Table 1, for the rubber-reinforced styrenic resin powder in Examples 1A to 3A, the aliphatic amide was adhered to the surface of the powder during a continuous production and a good antisticking property was obtained.

[Second Embodiment: Rubber-Reinforced Styrenic Resin Powder]

The second embodiment is a rubber-reinforced styrenic resin powder containing 40% by mass or more of a rubbery polymer, and having more than 4.0% by mass of the powder passing through a 200-mesh plain weave wire mesh (according to JIS G3555-2004) made of stainless steel wire with a wire diameter of 0.10 mm, wherein a fatty acid amide is present on 50% or more of the surface of the powder.

The rubber-reinforced styrenic resin powder of the present embodiment is obtained by coagulating the latex of the graft copolymer (A) obtained by an emulsion polymerization method with a styrenic monomer as an essential component, or a latex mixture of the latex of the graft copolymer (A) and the copolymer (B) obtained by an emulsion polymerization method with a styrenic monomer as an essential component. As the graft copolymer (A) and the copolymer (B), the same copolymers as in the first embodiment can be used.

The content of the rubbery polymer in the rubber-reinforced styrenic resin powder of the present embodiment is 40% by mass or more and is more preferable to be 50% by mass or more. The content of 40% by mass or more of the rubbery polymer can improve design freedom of components of the final composition containing the rubber-reinforced styrenic resin so as to contribute to product specialization. The upper limit of the content of the rubbery polymer is not particularly limited, and for example, it can be 90% by mass or less.

The content of the rubbery polymer in the rubber-reinforced styrenic resin powder can be adjusted by the content of the rubbery polymer constituting the graft copolymer (A) or mixing the graft copolymer (A) with the copolymer (B) in a latex state.

The rubber-reinforced styrenic resin powder of the present embodiment can be obtained by coagulating the latex of the graft copolymer (A), or mixing the latex of the graft copolymer (A) with the latex of the copolymer (B) and coagulating them.

Examples of the coagulating agent used for coagulation include inorganic acids such as hydrochloric acid, phosphoric acid, sulfuric acid, and nitric acid; organic acids such as formic acid and acetic acid; and inorganic acid metal salts such as magnesium sulfate, calcium chloride, and aluminum sulfate. These can be used singly or in combination of two or more.

The rubber-reinforced styrenic resin powder can be obtained by washing with water, dehydration, and drying after coagulation.

The rubber-reinforced styrenic resin powder of the present embodiment is one having more than 4.0% by mass of the powder passing through a 200-mesh plain weave wire mesh (according to JIS G3555-2004) made of stainless steel wire with a wire diameter of 0.10 mm. The ratio of powder passing through the plain weave wire mesh can be measured, for example, using a Sonic Shifter (manufactured by Seishin Enterprise Co., Ltd.). The ratio of the powder passing through the plain weave wire mesh is preferable to be 7.0% by mass or more, more preferable to be 10.0% by mass or more, and still more preferable to be 11.0% by mass or more. Furthermore, the upper limit of the ratio of the powder passing through the plain weave wire mesh is not particularly limited, but may be, for example, less than 30.0% by mass.

For the rubber-reinforced styrenic resin powder obtained by coagulation, it is necessary that the fatty acid amide is present on 50% or more of the surface of the powder. The presence of the fatty acid amide in the above range can suppress the sticking of the powder.

The coverage of the fatty acid amide on the surface of the powder can be measured using time-of-flight secondary ion mass spectrometry (TOF-SIMS method).

Examples of the method for adjusting the fatty acid amide which is present on the surface of the powder include a method of adding the fatty acid amide powder to the powder obtained by coagulation or a method of adding the emulsified dispersion of the fatty acid amide during coagulation. The amount of the fatty acid amide added (solid content) is preferable to be 0.1 to 2 parts by mass with respect to 100 parts by mass of the powder, and is more preferable to be 0.2 to 1 parts by mass. At less than 0.1 parts by mass, it is difficult to control the coverage of the fatty acid amide which is present on the surface of the powder to 50% or more, and at more than 2 parts by mass, there is a tendency not to further contribute to an improvement in the antisticking property. The basis of the amount of the fatty acid amide added (solid content) may be 100 parts by mass in terms of the solid content of the latex raw material, instead of the above "100 parts by mass of the powder".

Examples of the fatty acid amide which can be used in the present embodiment include oleic acid amide, palmitic acid amide, stearic acid amide, and ethylene bis stearic acid amide. When a fatty acid amide is used as an emulsified dispersion, the method of emulsification and dispersion is not particularly limited, and examples thereof include mechanical dispersion such as a bead mill and a melt dispersion method such as a phase inversion method. The type of the emulsifier used for emulsification and dispersion is also not particularly limited, and known emulsifiers can be used. The emulsified dispersion of the fatty acid amide is preferable to have an average particle size of 1.0 µm or less which is confirmed by the dynamic light scattering method.

Examples of the method for adjusting the coverage of the fatty acid amide which is present on the surface of the powder to 50% or more include the above methods, and among them, a method of adding the emulsified dispersion of a fatty acid amide during coagulation is preferable. The details will be described below.

A step of coagulation can be performed in batch mode in a single coagulation bath or in continuous treatment mode in two or more coagulation baths. The timing of adding the emulsified dispersion of a fatty acid amide is preferable to add the dispersion after the latex is slurried with a coagulating agent. The addition after the latex is slurried allows the fatty acid amide to be efficiently present on the surface of the powder and can suppress the sticking of the obtained powder. Furthermore, it is more preferable to increase the temperature in the coagulation bath after adding the emulsified dispersion of a fatty acid amide.

Examples of the method for adding the emulsified dispersion of the fatty acid amide in the continuous treatment mode include the method of addition to the second or later coagulation bath and the method of addition to the connecting pipe between coagulation baths. Among them, the method of addition to the pipe connecting the first and the second coagulation baths is preferable since the fatty acid amide can be efficiently present on the surface of the powder.

The temperature in the coagulating bath for coagulating and slurrying the latex is preferable to be 80 to 95° C. When the temperature in the coagulation bath is further increased after slurrying, a temperature of 90 to 98° C. is preferable, and the temperature is preferable to be 3 to 18° C. higher than the temperature in the coagulation bath to be subjected to slurrying. Furthermore, the slurry concentration is preferable to be 20 to 30% from the viewpoint of productivity.

Hereinafter, the second embodiment of the present invention will be described using Examples in detail, but the second embodiment is not limited at all by these.

<Method for Calculating the Coverage of Fatty Acid Amide Present on the Powder Surface>

The obtained rubber-reinforced styrenic resin powder is sorted into a 150 µm to 355 µm size powder passing through a 42 mesh wire mesh and deposited on a 100 mesh wire mesh. The coverage of the fatty acid amide present on the surface of the powder was measured from the amount of the fatty acid amide detected which was secondary ionized by using time-of-flight secondary ion mass spectrometry (TOF-SIMS method). The coverage with respect to the powder base material was determined by the following formula (1), and by the average of its values from 10 samples, the coverage of 50% or more was evaluated as "good", the coverage of 11% to 49% as "fair", and the coverage of 10% or less as "poor".

$$\text{Coverage of fatty acid amide (\%)} = ((\text{Detection area of secondary ion of fatty acid amide/Surface area of substrate}) - (\text{Detection area of secondary ion of substrate/Surface area of substrate} \times 0.7)) \times 100 \quad \text{Formula (1)}$$

<Evaluation Method of Antisticking Effect>

For the obtained rubber-reinforced styrenic resin powder, the repose angle was measured three times using Powder Tester MT-1000 (manufactured by Seishin Enterprise Co., Ltd.), and the average value of them was used. The repose angle is an index for evaluating the degree of sticking of the powder, and the lower value shows that the sticking is more suppressed. For the antisticking effect, 42% or less was evaluated as "good", 43 to 47% as "fair", and 48% or more as "poor".

<Measurement of Content of Powder Passing Through 200-Mesh Plain Weave Wire Mesh (According to JIS G3555-2004) Made of Stainless Steel Wire with a Wire Diameter of 0.10 mm>

Measurement was performed using Sonic Shifter (manufactured by Seishin Co., Ltd.).

<Method for Manufacturing Rubbery Polymer>

130 parts by mass of pure water, 100 parts by mass of butadiene, 0.4 parts by mass of normal dodecyl mercaptan, and 3 parts by mass of a 10% potassium oleate solution were supplied to a pressure-resistant reactor equipped with stirring blades, and the temperature was increased with stirring and 0.25 parts by mass of potassium persulfate was added at 65° C. Then, the temperature was increased to 70° C. and 22 parts by mass of a 10% potassium oleate solution was added stepwise, and the reaction was completed in 55 hours. The average particle size of the obtained butadiene rubber latex (measured using FPAR-1000, manufactured by Otsuka Electronics Co., Ltd.) was 0.41 μm, and the solid content was 39.1%.

<Method for Manufacturing Graft Copolymer>

153.45 parts by mass of the above butadiene rubber latex (60 parts by mass as a solid content) and 50 parts by mass of pure water were supplied to a reactor equipped with stirring blades; the temperature was increased with stirring; 0.3 parts by mass of potassium persulfate was added at 60° C.; the temperature reached 65° C. and then a mixed monomer consisting of 30 parts by mass of styrene and 10 parts by mass of acrylonitrile and 20 parts by mass of a 10% potassium oleate solution was continuously added over 6 hours; and the addition was completed and then aging was carried out at 70° C. for 2 hours. The solid content of the obtained graft copolymer latex was 37.3%.

<Emulsified Dispersion of Fatty Acid Amide>

The emulsified dispersion of ethylene bis stearic acid amide was used at a solid content of 25% and an average particle size of 0.4 μm (measured using FPAR-1000, manufactured by Otsuka Electronics Co., Ltd.).

(Example 1B)

Pure water was charged to a single type coagulation bath equipped with stirring blades so that the slurry concentration became 18% when 100 parts by mass of the graft copolymer latex in terms of solid content was completely added to the bath at the entire amount. Then, 4.0 parts by mass of magnesium sulfate was added and the temperature was increased to 75° C. with stirring. After the temperature reached 75° C., 100 parts by mass of the graft copolymer latex in terms of solid content was added to the inside of the bath, and after completion of the addition, 0.2 parts by mass of the emulsified dispersion of fatty acid amide was added in terms of solid content. After the addition, the temperature in the bath was heated to 90° C., after the temperature reached 90° C., the temperature was maintained for 5 minutes, and then washing with water, dehydration, and further drying at 85° C. for 15 hours with a hot air drier were performed. Then, the dried product was treated for 30 seconds with a mixer type pulverizer to obtain a rubber-reinforced styrenic resin powder. The obtained rubber-reinforced styrenic resin powder was characterized by: a repose angle of 41°; a content of the powder passing through a 200-mesh plain weave wire mesh of 14%; a good antisticking effect; and a good coverage of the fatty acid amide.

(Example 2B)

The treatment was performed under the same conditions as in Example 1B, except that the emulsified dispersion of fatty acid amide was added at 0.5 parts by mass in terms of solid content. The obtained rubber-reinforced styrenic resin powder was characterized by: a repose angle of 38°; a content of the powder passing through a 200-mesh plain weave wire mesh of 13%; a good antisticking effect; and a good coverage of the fatty acid amide.

(Example 3B)

The treatment was performed under the same conditions as in Example 1B, except that the emulsified dispersion of fatty acid amide was added at 1.5 parts by mass in terms of solid content. The obtained rubber-reinforced styrenic resin powder was characterized by: a repose angle of 36°; a content of the powder passing through a 200-mesh plain weave wire mesh of 15%; a good antisticking effect; and a good coverage of the fatty acid amide.

(Comparative Example 1B)

The treatment was performed under the same conditions as in Example 1B, except that the emulsified dispersion of fatty acid amide was not added. The obtained rubber-reinforced styrenic resin powder was characterized by: a repose angle of 49°; a content of the powder passing through a 200-mesh plain weave wire mesh of 14%; a poor antisticking effect; and a poor coverage of the fatty acid amide.

(Comparative Example 2B)

Pure water was charged to a single type coagulation bath equipped with stirring blades so that the slurry concentration became 18% when 100 parts by mass of the graft copolymer latex in terms of solid content was completely added to the bath at the entire amount. Then, 4.0 parts by mass of magnesium sulfate was added and the temperature was increased to 75° C. with stirring. After the temperature reached 75° C., a mixture of 100 parts by mass of the graft copolymer latex in terms of solid content and 2.0 parts by mass of the emulsified dispersion of fatty acid amide was added, after completion of the addition, the temperature in the bath was heated to 90° C., after the temperature reached 90° C., the temperature was maintained for 5 minutes, and then washing with water, dehydration, and further drying at 85° C. for 15 hours with a hot air drier were performed. Then, the dried product was treated for 30 seconds with a mixer type pulverizer to obtain a rubber-reinforced styrenic resin powder. The obtained rubber-reinforced styrenic resin powder was characterized by: a repose angle of 48°; a content of the powder passing through a 200-mesh plain weave wire mesh of 13%; a poor antisticking effect; and a poor coverage of the fatty acid amide.

(Comparative Example 3B)

The treatment was performed under the same conditions as in Example 1B, except that the emulsified dispersion of fatty acid amide was added at 0.05 parts by mass in terms of solid content. The obtained rubber-reinforced styrenic resin powder was characterized by: a repose angle of 27°; a content of the powder passing through a 200-mesh plain weave wire mesh of 13%; a poor antisticking effect; and a fair coverage of the fatty acid amide.

(Comparative Example 4B)

Pure water was previously charged to a single type coagulation bath equipped with stirring blades so that the slurry concentration became 18% when 100 parts by mass of the graft latex in terms of solid content was completely added at the entire amount. Then, 4.0 parts by mass of magnesium sulfate was added and the temperature was increased to 75° C. with stirring. After the temperature reached 75° C., 100 parts by mass of the graft copolymer latex in terms of solid content was added, after completion of the addition, the temperature in the bath was heated to 90° C., after the temperature reached 90° C., the temperature was maintained for 5 minutes, and then 0.5 parts by mass of the emulsified dispersion of fatty acid amide was added in terms of solid content and maintained for 10 minutes. After the addition, washing with water, dehydration, and further drying at 85° C. for 15 hours with a hot air drier were performed. Then, the dried product was treated for 30 seconds with a mixer type pulverizer to obtain a rubber-reinforced styrenic resin powder. The obtained rubber-reinforced styrenic resin powder was characterized by: a repose angle of 44°; a content of the powder passing through a 200-mesh plain weave wire mesh of 13%; a poor antisticking effect; and a fair coverage of the fatty acid amide.

TABLE 2

| | Example 1B | Example 2B | Example 3B | Comparative Example 1B | Comparative Example 2B | Comparative Example 3B | Comparative Example 4B |
|---|---|---|---|---|---|---|---|
| Number of parts by mass added of fatty acid amide | 0.2 | 0.5 | 1.5 | — | 2 | 0.05 | 0.5 |
| Timing of adding fatty acid amide | After complete addition of latex | ← | ← | — | Addition to latex | After complete addition of latex | After heat treatment of slurry |
| Content of powder (%)* | 14 | 13 | 15 | 14 | 13 | 13 | 13 |
| Antisticking effect | good | good | good | poor | poor | poor | poor |
| Coverage of fatty acid amide | good | good | good | poor | poor | fair | fair |

*Content of powder passing through a 200-mesh plain weave wire mesh

As shown in Table 2, since the rubber-reinforced styrenic resin powders in Examples 1B to 3B satisfied the coverage of the aliphatic amide on the surface of the powder defined in the present invention, a good antisticking property was obtained.

INDUSTRIAL APPLICABILITY

As described above, the rubber-reinforced styrenic resin powder of the present invention is excellent in antisticking property, and hence excellent in storage stability and a handling property. Therefore, the rubber-reinforced styrenic resin powder can be suitably used on sites wherein the rubber-reinforced styrenic resin powder is manufactured and handled.

REFERENCE SIGNS LIST

1: The first coagulation bath; 2: The second coagulation bath; 3: Connecting pipe; 4: Connecting part; 5a, 5b, 7, and 8: Raw material supply port; and 9: Discharge port.

The invention claimed is:

1. A method for manufacturing a rubber-reinforced styrenic resin powder comprising 40% by mass or more of a rubbery polymer, satisfying the following conditions (1) to (4):
   (1) at least first and second coagulation baths are provided;
   (2) the first and second coagulation baths are connected by a connecting part; wherein the connecting part comprises a supply port;
   (3) an emulsified dispersion of ethylene bis-stearic acid amide is supplied to the connecting part through the supply port during transfer of slurry between the first and second coagulation baths; wherein the ethylene bis-stearic acid amide is supplied in an amount of 0.3 parts by mass to 2.0 parts by mass (solid content) with respect to 100 parts by mass (solid content) of a slurry; and
   (4) a temperature in the second coagulation bath is equal to or higher than a temperature in the first coagulation bath;
   wherein the rubber-reinforced styrenic resin comprises a graft copolymer obtainable by graft polymerization of monomers to the rubbery polymer;
   wherein the rubbery polymer is one or more selected from the group consisting of butadiene-based rubbery polymer, (meth)acrylic rubbery polymer, composite rubbery polymer of butadiene-based rubbery polymer/(meth)acrylic rubbery polymer, and composite rubbery polymer of silicone rubbery polymer/(meth)acrylic rubber polymer;
   wherein the monomers are selected from the group consisting of aromatic vinyl monomer/vinyl cyanide monomer and aromatic vinyl monomer/vinyl cyanide monomer/(meth)acrylic acid ester monomer;
   wherein the temperature in the second coagulation bath is from 85 to 98° C.; and
   wherein the difference in temperature between the first coagulation bath and the second coagulation bath is from 3 to 28° C.

2. The method of claim 1, wherein the emulsified dispersion of ethylene bis-stearic acid amide is supplied to the connecting part in an amount of 0.3 parts by mass to 1.5 parts by mass (solid content) with respect to 100 parts by mass (solid content) of the slurry.

3. The method of claim 1, wherein the emulsified dispersion of ethylene bis-stearic acid amide is supplied to the connecting part in an amount of 0.4 parts by mass to 1.0 parts by mass (solid content) with respect to 100 parts by mass (solid content) of the slurry.

4. The method of claim 3, wherein the aromatic vinyl monomer is styrene; and wherein the vinyl cyanide monomer is acrylonitrile.

* * * * *